United States Patent [19]

Langen et al.

[11] Patent Number: 4,944,354
[45] Date of Patent: Jul. 31, 1990

[54] THREE-POINT COUPLING DEVICE

[75] Inventors: Hans Langen, Frechen; Norbert Fartmann, Siegburg; Herbert Coenen, Geilenkirchen, all of Fed. Rep. of Germany

[73] Assignee: Jean Walterscheid GmbH, Lohmar, Fed. Rep. of Germany

[21] Appl. No.: 334,454

[22] Filed: Apr. 6, 1989

[30] Foreign Application Priority Data

Apr. 13, 1988 [DE] Fed. Rep. of Germany ....... 3812198

[51] Int. Cl.⁵ .............................................. A01B 59/06
[52] U.S. Cl. ...................... 172/47; 172/272; 172/439
[58] Field of Search .................. 172/272–275, 172/47, 439; 37/231

[56] References Cited

U.S. PATENT DOCUMENTS

| 3,299,979 | 1/1967 | Reestall | 180/14 |
| 3,722,915 | 3/1973 | Gail | 172/272 X |
| 3,791,456 | 2/1974 | Koch | 172/248 X |
| 3,871,463 | 3/1975 | Geisthoff | 172/272 X |
| 3,977,698 | 8/1976 | von Allwörden | 172/272 |
| 4,071,105 | 1/1978 | von Allwörden | 172/272 X |
| 4,146,246 | 3/1979 | Geisthoff | 172/275 |
| 4,149,736 | 4/1979 | von Allwörden | 172/272 |
| 4,176,727 | 12/1979 | Perin | 172/272 X |

FOREIGN PATENT DOCUMENTS

| 257997 | 11/1967 | Austria | 172/272 |
| 2435477 | 5/1975 | Fed. Rep. of Germany . | |
| 1541477 | 10/1968 | France | 172/272 |
| 1145313 | 3/1969 | United Kingdom . | |
| 2199227 | 7/1988 | United Kingdom | 172/272 |

Primary Examiner—Randolph A. Reese
Assistant Examiner—Jeffrey L. Thompson
Attorney, Agent, or Firm—Torey, McGeady & Associates

[57] ABSTRACT

The invention relates to an three-point coupling device (3) for connecting a tractor to an implement (4). Two lower hitch arms (5, 5a) have been provided with catching hooks (7, 7a). An upper hitch arm (8) has also been provided with a catching hook (11). The lower hitch arms (5, 5a) may be raised or lowered by a power drive via lifting bars (10, 10a) and lifting arms (9, 9a). The upper hitch arm (8) is suspended from a holding device (20, 20a) which is associated with the lifting bars (10, 10a). As a result, the upper hitch arm (8) may be moved jointly with the lower hitch arms (5, 5a) upon actuation of the power drive which moves the lifting arms (9, 9a) and the lifting bar (10, 10a). It is no longer necessary for the tractor driver to hold the upper hitch arm (8) himself and place it on the upper coupling point (14) of the implement (4).

12 Claims, 5 Drawing Sheets

THREE-POINT COUPLING DEVICE

BACKGROUND OF THE INVENTION

1. Field of the Invention

This invention relates to a three-point coupling device for coupling a tractor to an implement, comprising two lower hitch arms which are articulted in an offset way at the rear end of the tractor on different sides of the longitudinal axis of the tractor and whose free ends have each been provided with a catching hook having a lockable catching jaw which is open towards the top, with each lower hitch arm, via a lifting bar, being connected to a lifting arm movable by the power drive of the tractor; and comprising an upper hitch arm whose one end is articulated at the rear end of the tractor above the lower hitch arms in the region of the longitudinal axis and whose other end has been provided with a catching hook comprising a lockable catching jaw which opens towards the bottom or top, with the catching hooks, for coupling purposes, being suitable for engaging, or being released from, the corresponding coupling points of the implement to be coupled.

2. Description of Prior Art

With such a three-point coupling device the lower steering arms are coupled to the lower articulation points of the implement by driving the tractor towards the implement and lifting the lower hitch arms after the tractor has reached a position where it is approximately close enough to the implement. To facilitate coupling, the lower hitch arms are provided with catching hooks which are described for example in DE PS No. 25 10 490 and 30 33 663. Alignment of the catching hooks is facilitated for example by a catching profile known from DE PS No. 35 06 670.

The connection between the upper arm, which is also provided with a catching hook, and the upper coupling point is effected manually by the tractor driver who, either by lifting the upper hitch arm or actuating the already coupled lower hitch arms, has to achieve a coupling position for the catching hook of the upper hitch arm relative to the articulation point of the implement in order, then, to lower the upper hitch arm by hand. Such an upper hitch arm is known from DE-PS No. 26 08 276 for example.

In this procedure the tractor driver has to bend backwards to be able to hold and align the upper hitch arm, whereas at the same time he has to handle the steering wheel with the other hand to align the tractor relative to the implement and move it into an advantageous coupling position.

This type of procedure is complicated and also exhausting.

Furthermore, there is a prior art three-point coupling device in the case of which the lower hitch arms and the upper hitch arm have been provided with a triangular frame designed to engage a frame attached to the implement (U.S. Pat. No. 3 299 979).

The frame represents an additional component which, furthermore, has to be removed when the tractor is to be used in conjunction with a trailer. Because such a frame has to accommodate tensile and load bearing forces, it has to be of a stable design and is difficult to handle.

It is therefore an object of the present invention to provide a three-point coupling device which is easy to handle, does not require any strength on the part of the driver nor any re-fitting at the tractor rear when changing from trailer operation to the use of a three-point coupling device and vice versa.

SUMMARY OF THE INVENTION

The invention provides a three-point coupling device for coupling a tractor to an implement, comprising two lower hitch arms which are articulated in an offset way at the rear end of the tractor on different sides of the longitudinal axis of the tractor and whose free ends have each been provided with a catching hook having a lockable catching jaw which is open towards the top, with each lower hitch arm, via a lifting bar, being connected to a lifting arm movable by the power drive of the tractor; and comprising an upper hitch arm whose one end is articulated at the rear end of the tractor above the lower hitch arms in the region of the longitudinal axis and whose other end has been provided with a catching hook comprising a lockable catching jaw which opens towards the bottom or top, with the catching hooks, for coupling purposes, being suitable for engaging, or being released from, the corresponding coupling points of the implement to be coupled, wherein the upper hitch arm is resiliently held by tension springs to move upwards or downwards relative to the tractor with the lower hitch arms, with the upper hitch arm moving in the same or the opposite direction to the lower hitch arms.

Because the movement of the upper hitch arm is coupled to the lower hitch arms, the driver can concentrate fully on steering the tractor. By actuating the lower hitch arms he can cause the upper steering arm to engage the articulation point at the implement. Especially with larger tractors or tractors provided with a cab, such a method of operation is much simpler than in those cases where the upper hitch arm is separated from the lower hitch arms, i.e. if it can only be positioned by hand. But the advantages of the design in accordance with the invention are the same as those achieved with a tractor and implement equipped with a coupling frame. Furthermore, there is the additional advantage in that there is no frame which has to be removed when changing over from a three point coupling device to trailer operation. As a rule, such triangular frames are heavy because they have to accommodate all the forces. With the solution according to the invention, the space between the upper hitch arm and the lower hitch arms remains free so that this space is easily accessible and permits the attachment of a trailer without limiting its movement.

Coupling of the movement of the upper hitch arm to the movement of the lower hitch arms may be effected in two different ways.

If upper and lower steering arms move in the same direction, the upper hitch arm is lowered by lowering the lower hitch arms after the tractor has been aligned approximately relative to the implement, and the upper hitch arm is then positioned on the respective coupling point of the implement. When lifting the lower hitch arms, the lower steering arm catching hooks grip the lower coupling points, and in the course of the further raising operation, the upper hitch arm slides on the upper coupling point until its catching hook finally coincides with the position of the upper coupling point and engages it if this has not already happened.

If movement takes place in the opposite direction, the tractor, with its lower hitch arms, is first aligned relative to the lower articulation points of the implement.

Prior to this, the lower hitch arms were lowered far enough for the catching hooks to engage underneath the lower coupling points at the implement. While the lower hitch arms were lowered, the upper hitch arm was raised at the same time. By raising the lower hitch arms, the lower catching hooks engage the lower coupling points of the implement. At the same time, the upper hitch arm is lowered on to the coupling point for the upper hitch arm and deposited while being aligned laterally. When raised further, the upper hitch arm slides on the upper coupling point until the upper hitch arm catching hook can engage the upper coupling point.

With both types of movement, it is possible, in addition to the coupling methods described, to carry out modified coupling processes which depend on the position of the implement and on the position of the coupling points.

If the distance between the upper coupling point and the catching hook of the upper hitch arm is smaller than the distance between the catching hooks of the lower hitch arms and the lower coupling points of the implement, it is advisable first to place the upper hitch arm on to the upper coupling point without causing it to engage and then to move the catching hooks of the lower hitch arms underneath the lower coupling points and subsequently causing them to engage by raising them. Then the upper hitch arm is coupled by raising the lower hitch arms as described above. If the distance between the upper coupling point of the implement and the catching hook of the upper hitch arm is greater than the distance between the catching hooks of the lower hitch arms and the lower coupling points of the implement, the upper hitch arm is first fully coupled while simultaneously moving the lower hitch arms in the lowered condition underneath the lower coupling points. By subsequently moving the tractor forward, the catching hooks on the lower steering arms are moved into the coupling position relative to the coupling points of the implement. An upper hitch arm whose length is adjustable facilitates the coupling process.

To achieve movement in the same direction, it is proposed in a further embodiment that the upper hitch arm should be aligned and held by providing two intermediate tension springs one end of each of which is connected to the upper hitch arm and the other end of each of which is connected to a lifting arm or a lifting bar of the lower hitch arms. On the one hand, the tension springs ensure alignment and coupling of the upper hitch arm to permit movement in the same direction as the lower hitch arms, but on the other hand they do not interfere with the raising and lowering of the coupled implement after completion of the coupling process.

To allow the upper hitch arm to move in the opposite direction, it is proposed in a further embodiment that the upper hitch arm should be held by providing two intermediate tension springs, one end of each of which is connected to the upper hitch arm and the other end of each of which is connected to pulling means, for example a rope, which is first guided by deflection means fixed to the tractor rear and then attached to lifting arms or lifting bars of the lower hitch arms or to the lower steering arms themselves. By additionally providing ropes and guiding them via a stationary deflection point, the movement of the upper hitch arm is reversed relative to the lower steering arms. When the lower hitch arms are raised, the upper hitch arm is lowered and when the lower steering arms are lowered the upper hitch arm is raised.

Movement in the same direction and in the opposite direction, in this context, refers to the relative movement, but not to the absolute values of movement of the upper hitch arm and the lower hitch arms.

In order to facilitate the coupling process further, the catching hooks are designed so as to lock automatically. In consequence, there is no need for the tractor driver to carry out the locking process manually.

To perfect the system and also to permit automatic coupling of an implement driven by a power take-off shaft, a further embodiment provides for the three-point coupling device in accordance with the invention to also comprise a coupler for the driveshaft for passing on the rotary movement of the power take-off shaft of the tractor to the input shaft of the implement to be driven. To facilitate coupling of the driveshaft, the latter consists of a first portion comprising a joint and a profiled tube firmly attached to it as well as an accident preventing device which remains stationary relative to the joint and the profiled tube and which is connected to lifting bars or lifting arms of the lower hitch arms by two holding springs; and of a second portion which comprises a joint and a profiled member which is firmly attached to it and which may be inserted into the profiled tube, as well as an accident preventing device.

This means that the driveshaft is divided in the region where the plunging movement takes place. By suspending the first portion of the driveshaft, i.e. the driveshaft part associated with the tractor, by means of holding springs it is possible to align the driveshaft relative to the second portion which is held in an approximate position, with the first portion of the driveshaft also being moved when actuating the power drive for the lower hitch arms because the holding springs are also connected to the lifting arms or lifting bars. This means that a movement in the same direction as that of the lower hitch arms is achieved.

To facilitate coupling of the two driveshaft portions, the profiled member is provided with a conical introducing journal and the profiled tube with an introducing sleeve. The process of coupling the driveshaft via holding springs to a frame and providing an introducing journal and an introducing sleeve for turning and aligning the profiled member relative to the profiled tube is known in itself (U.S. Pat. No. 3 299 979).

Furthermore, it is possible to provide means for mutual lateral alignment at the upper hitch arm and/or in the region of the upper coupling point of the implement.

BRIEF DESCRIPTION OF THE DRAWINGS

Various embodiments of the invention are diagramatically illustrated in the drawings wherein.

DESCRIPTION OF PREFERRED EMBODIMENTS

Figure 1:
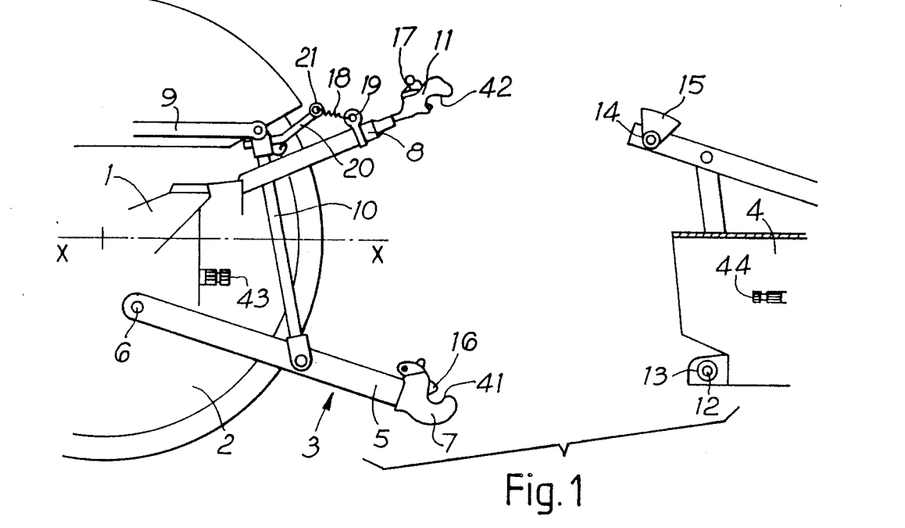
FIG. 1 is a side elevational view of the rear end of a tractor with a first embodiment of a three-point coupling device in accordance with the invention, with part of the implement to be coupled shown spaced therefrom.

FIG. 1 is a side elevational view of a tractor and the implement 4 in separated positions. Only the tractor rear 1 and the rear wheel 2 are shown. A three-point coupling device 3 is connected to the tractor rear 1. The three point coupling device consists of the two lower hitch arms 5, 5a which are articulated at the axle housing of the tractor at the tractor rear 1. The two lower hitch arms 5, 5a are arranged, so as to be offset, on either side of the longitudinal axis X—X of the tractor. The articulation points of the lower hitch arms 5, 5a have been given the reference number 6. At their free ends, the lower hitch arms 5, 5a have been provided with catching hooks 7, 7a. The catching jaw 41 of the lower hitch arm catching hooks 7, 7a open towards the top and may be locked by a bolt 16.

Figure 2:
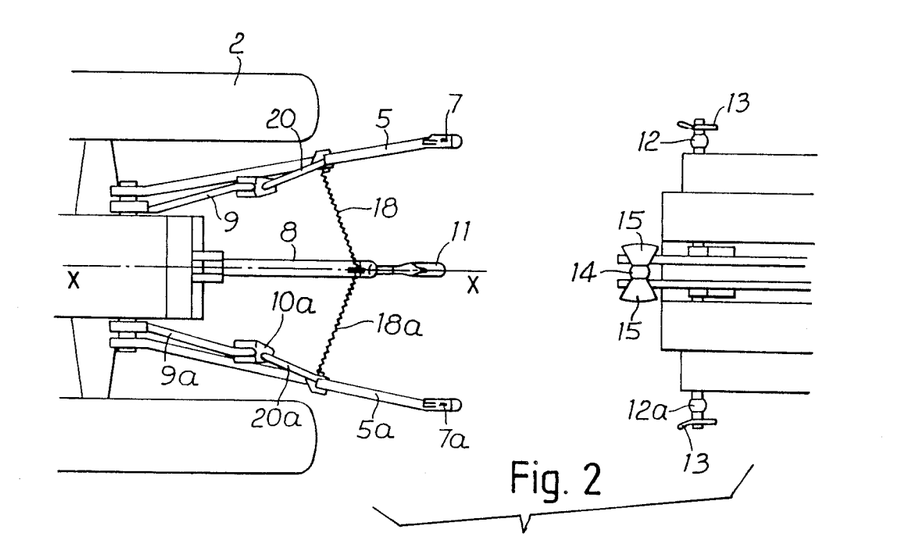
FIG. 2 is a plan view of the embodiment shown in FIG. 1.

The two lower hitch arms 5, 5a are connected to lifting arms 9, 9a via lifting bars 10, 10a. The lifting arms 9, 9a are moved in the vertical plane by a power lever (not illustrated) associated with the tractor. Via the lifting arms 9, 9a and the lifting bars 10, 10a, the lower hitch arms 5, 5a may be raised or lowered by the power drive.

Above, and centrally relative to the lower hitch arms 5, 5a, there has been provided an upper hitch arm 8 one end of which is articulated at the tractor rear 1. The free end of the upper hitch arm 8 has also been provided with a catching hook 11 whose catching jaw 42 opens downwards and may be locked by a bolt 17.

The implement 4 to be coupled has been provided with lower coupling points 12, 12a and an upper coupling point 14 which are arranged so as to be suitable for the lower hitch arms 5, 5a and the upper hitch arm 8. The lower coupling points 12, 12a are also laterally offset relative to the longitudinal axis X—X, whereas the upper coupling point 14 as well as the articulation point of the upper hitch arm 8 at the tractor rear 1 are located approximately in the region of the longitudinal axis X—X of the tractor.

The lower coupling points 12, 12a and the upper coupling point 14 of the implement 4 have been given a partly spherical design for example. The lower coupling points 12, 12a have additionally been associated with catching profiles 13 having spherical centering faces which facilitate the coupling of the catching hooks 7, 7a of the lower hitch arms 5, 5a. The upper coupling point 14 of the implement 4 has additionally been provided with laterally arranged centering aids 15 similar to the catching profiles of the lower hitch arms, on both sides of the sphere of the coupling point and guiding means which permit lateral alignment and guidance of the upper hitch arm 8 relative to the upper coupling point 14 of the implement 4.

The upper hitch arm 8 is held relative to the two lifting bars 10, 10a by two tension springs 18, 18a. For this purpose, each lifting bar 10, 10a has been provided with a holding device 20, 20a. The upper hitch arm 8 has been provided with a fixing eye 19 for suspending the tension springs 18, 18a. One end of the tension spring 18 is suspended in the eye 19 at the upper hitch arm 8. The other end of the tension spring 18 is suspended in the eye 21 of the holding device 20 which is associated with the lifting bar 10. The other spring 18a, with its one end, is also suspended in the fixing eye 19 at the upper hitch arm 8, whereas its other end is fixed at the eye 21 of the holding device 20a attached to the lifting bar 10a.

The upper hitch arm 8 is aligned centrally due to being attached to the holding devices 20, 20a and the lifting bars 10, 10a and due to the V-shaped arrangement of the two tension springs 18, 18a. At a distance from the articulation point of the upper hitch arm 8 at the tractor rear, the fixing eye 19 of the upper hitch arm 8 is offset towards the front in the direction of the catching hook 11. This design ensures lateral alignment. Furthermore, the upper hitch arm 8, by being coupled to the lifting bar 10, 10a, is raised and lowered in the same sense as the lower hitch arms 5, 5a when the power drive is actuated.

Figure 5:
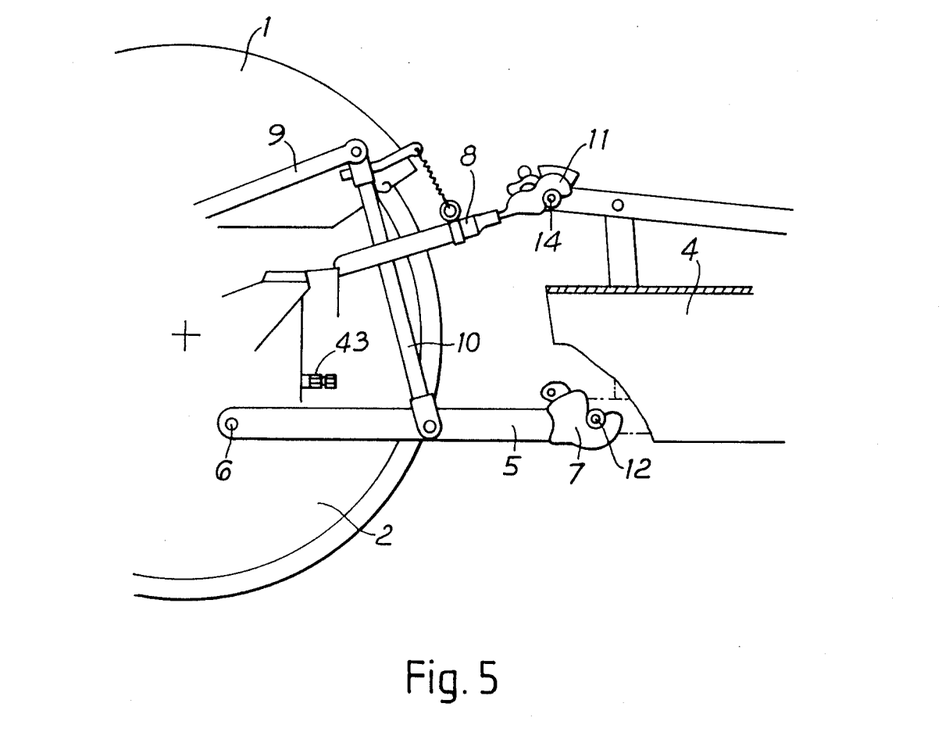
FIG. 5 is a view similar to FIG. 1 showing an implement in the coupled position.

Coupling of the implement 4 to the tractor is effected in such a way that first the tractor approaches the implement 4 such that the upper hitch arm 8 is aligned relative to the coupling point 14 of the implement 4, with the centering aids 15 assisting with lateral alignment. By moving the tractor forwards and backwards it is possible to align the catching hook 11 of the upper hitch arm relative to the upper coupling point 14 of the implement. The lower hitch arms 5 and 5a are lowered by actuating the power lever. This movement is not interfered with because the springs 18, 18a permit a relative movement between the upper hitch arm 8 and the two lower hitch arms 5, 5a. Lowering continues until the catching hooks 7, 7a of the lower hitch arms are located below the lower coupling points 12, 12a. By moving forward or reversing or lifting it is possible to achieve tilting of the implement 4 either forwards or backwards and in consequence, alignment of the catching hooks 7, 7a of the lower hitch arms 5, 5a relative to the coupling points 12, 12a. When the upper hitch arm 8 is first coupled, it helps to align the implement 4. By raising the lower hitch arms 5, 5a, the lower catching hooks 7, 7a, while making use of the catching profiles 13, are aligned laterally relative to the lower coupling points 12, 12a so that the spheres associated with the coupling points 12, 12a enter the catching jaws 41 of the two catching hooks 7, 7a and are locked in this position by the locking bolts 16. The implement 4 is now in the coupled position as illustrated in FIG. 5. The locking bolts 16, 17 of the lower hitch arm catching hooks 7, 7a and of the upper hitch arm catching hook 11 may be designed in such a way that, after the upper coupling point 14 and the lower coupling points 12, 12a have been fully engaged, they are automatically transferred into a locking position. For this purpose, the bolts 16, 17 may be loaded by springs.

Figure 3:
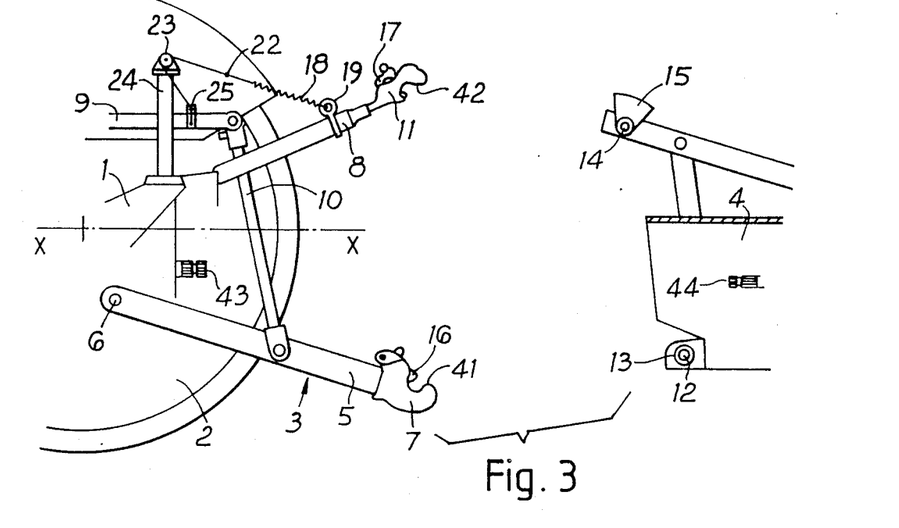
FIG. 3 is a side elevational view of the rear end of a tractor with a second embodiment of a three-point coupling device in accordance with the invention, with part of the implement to be coupled shown spaced therefrom.
Figure 4:
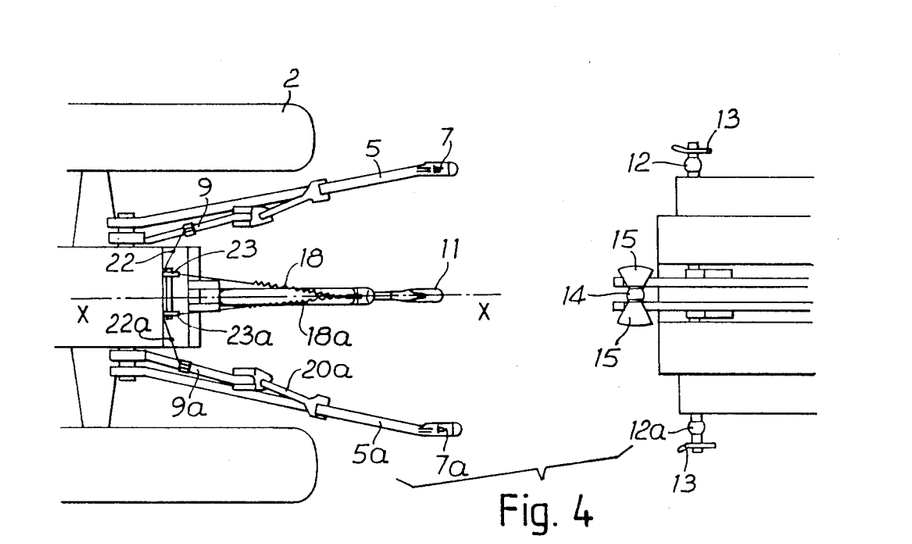
FIG. 4 is a plan view of the embodiment shown in FIG. 3.

The embodiment of FIGS. 3 and 4 differs from that of FIGS. 1, 2 and 5 in that the upper hitch arm 8 is articulated in a different way relative to the movement of the lower hitch arms 5, 5a. The upper steering arm 8 has also been provided with two tension springs 18, 18a which are suspended in the fixing eye 19. The respective other ends of the tension springs 18, 18a are attached to pulling means in the form of two ropes 22, 22a. These two ropes 22, 22a are guided via two deflector pulleys 23, 23a immovably attached to the tractor rear 1 and from there they are taken in the direction of the two lifting arms 9, 9a. The ropes 22, 22a are attached to the two lifting arms 9, 9a by fixing clamps 25. The deflector pulleys 23, 23a are each rotatably received in a holding device 24. The holding devices 24 are fixed to the tractor rear 1. By guiding the ropes 22, 22a via the deflector pulleys 23, 23a the movement of the lower hitch arms 5, 5a is reversed. When the lower steering arms 5, 5a are lowered via the lifting bars 10, 10a and the lifting arms 9, 9a, the upper hitch arm 8 is raised. When the lower hitch arms 5, 5a are raised, the upper hitch arm 8 is lowered.

Figure 6:
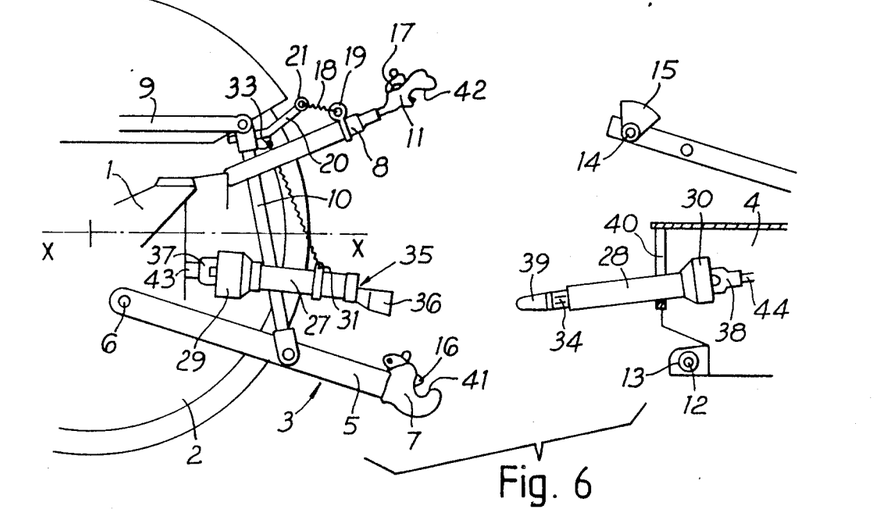
FIG. 6 is a side elevational view of the rear end of a tractor with a third embodiment of a three-point coupling device combined with a driveshaft to be coupled, and of part of an implement.
Figure 7:
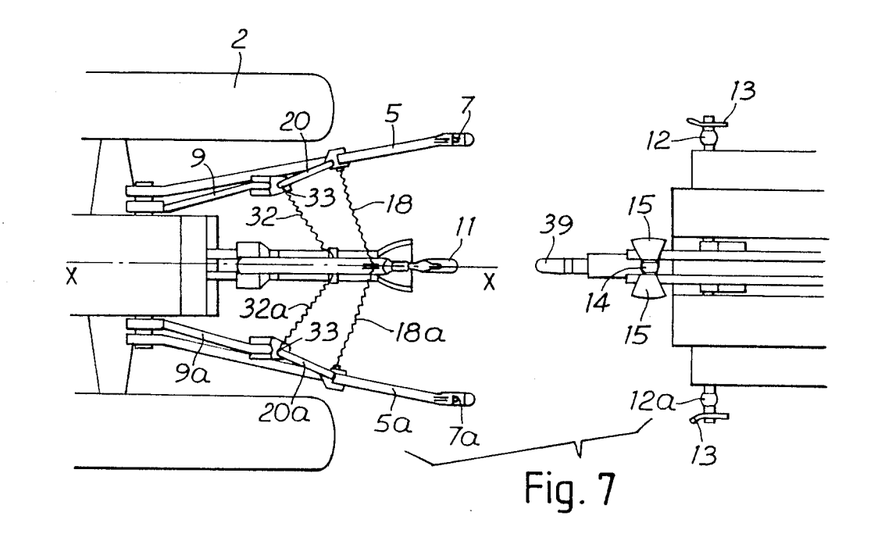
FIG. 7 is a plan view of the embodiment shown in FIG. 6.
Figure 8:
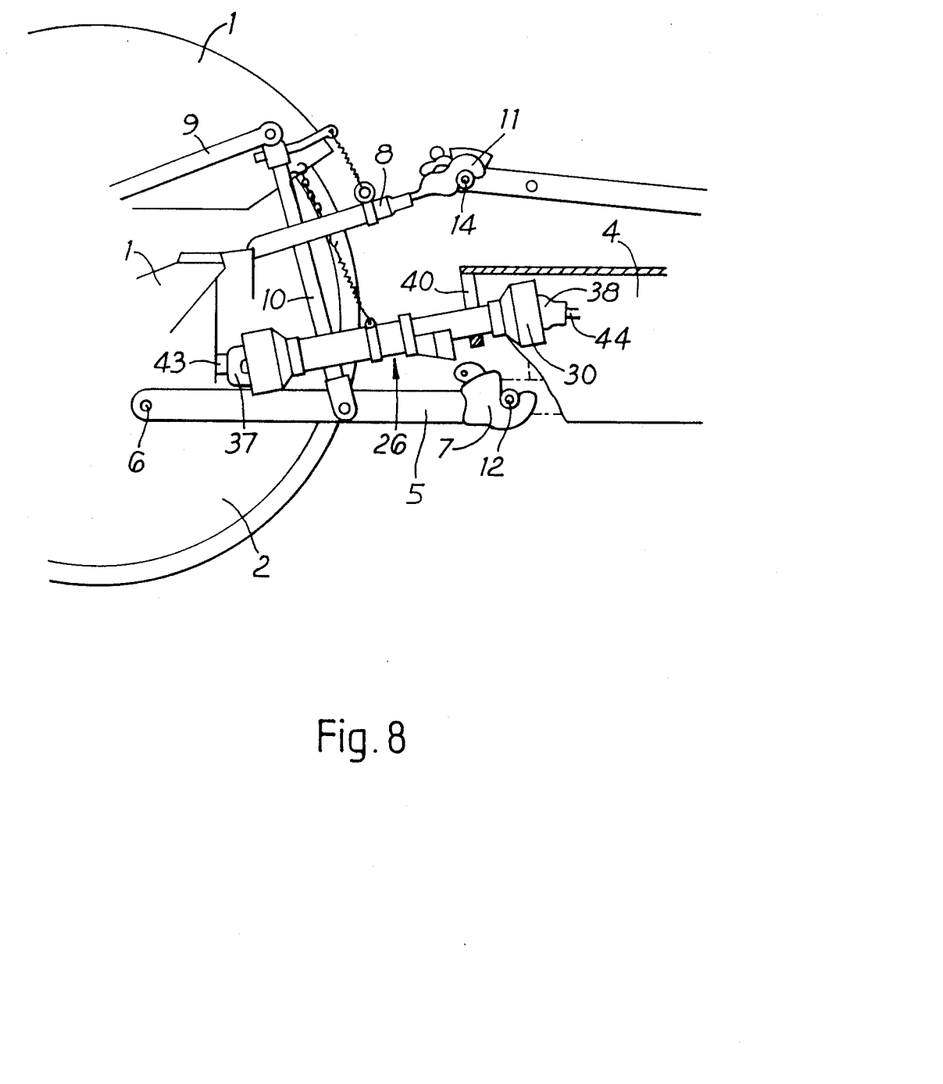
FIG. 8 is a view similar to FIG. 6 showing the implement including the driveshaft in the coupled position.

In accordance with one of the coupling alternatives, the coupling operation proceeds as follows for example: Again, the tractor is aligned relative to the implement 4 in such a way that the upper hitch arm 8 is aligned approximately relative to the upper coupling point 14. The power drive is actuated in such a way that the lower hitch arms 5, 5a are lowered, with the upper steering arm 8 moving upwards at the same time. The tractor is reversed until the two catching hooks 7, 7a of the lower hitch arms are aligned relative to the lower coupling points 12, 12a of the implement 4. The lower hitch arms 5, 5a are then moved upwards via the lifting bars 10, 10a and the lifting arms 9, 9a so that the catching hooks 7, 7a of the lower hitch arms 5, 5a are able to catch the lower coupling points 12, 12a of the implement 4. In the process, the upper hitch arm 8 is lowered and aligned laterally relative to the upper coupling point 14 by the two centering aids 15. By continuing to raise and couple the lower hitch arms 5, 5a, the implement 4 tilts backwards, with the upper coupling point 14 being moved in the direction of the catching hook 11 of the upper hitch arm 8 and the catching jaw 42 of the upper hitch arm 8 until both have been moved into corresponding positions and until the catching jaw 42 may be made to engage the upper coupling point 14. Locking of the lower catching hooks 7, 7a and of the catching hook 11 of the upper hitch arm is also effected via the spring-loaded locking bolts 16, 17. The tension springs 18, 18a also permit a relative movement between the lower hitch arms 5, 5a and the upper hitch arm 8 when the latter has been deposited in, or engaged, the region of the upper coupling point 14. When continuing to raise the lower hitch arms 5, 5a, the movement in the opposite direction does not cause any force to be exerted on the upper hitch arm 8 in the sense of lowering it until secure coupling at the upper articulation point under the weight of the upper hitch arm 8 has taken place. In the embodiment of FIGS. 6 to 8, the three-point coupling device according to the embodiment to FIGS. 1 to 3 is shown in conjunction with a divided driveshaft 26 intended for automatic coupling.

As can be seen especially in FIGS. 6 and 7, the tractor is associated with a first portion 27 of the driveshaft 26. The first portion 27 consists of a joint 37 whose joint yoke may be non-rotatingly connected to the power take-off shaft 43 of the tractor via a sleeve. The other joint yoke of the joint 37 carries the profiled tube (not visible). The joint 37 and the profiled tube are surrounded by an accident preventing device 29 which consists of a funnel and a tube. The tube of the accident preventing device 29 has been provided with a fixing eye 31. Two holding springs 32, 32a are suspended in the fixing eye 31. The first holding spring 32 is suspended in the lifting arm 9 via a fixing eye 33. The second spring 32 is suspended in the lifting arm 9a via the fixing eye 31. This means that the first portion 27 of the driveshaft may be moved synchronously with the lower hitch arms 5, 5a. Furthermore, the first driveshaft portion 27 is aligned approximately centrally as a result.

The first driveshaft portion 27 or its profiled tube has been provided with an introducing sleeve 35 (not visible) which permits alignment of the other driveshaft portion 28 and its profiled tube 34.

The second driveshaft portion 28 is associated with the implement 4. The joint 38 of the second driveshaft portion 28 is non-rotatingly connected to the input shaft 44 of the implement 4. Furthermore, the joint 38 which is provided with an accident preventing device 30 has been attached to a profiled tube 34 which may be introduced into the profiled tube of the first driveshaft portion 27 and which, in the condition as introduced, effects a non-rotating connection between the profiled tubes for the purpose of passing on the torque.

To facilitate the process of introduction, the profiled tube 34 has been provided with an introducing journal 39 and the accident preventing device 29 with a catching dish 36, which two parts permit alignment. To allow alignment in the circumferential direction, the introducing sleeve 35 of the profiled tube of the first driveshaft portion 27 has been provided with inclined faces at which the catching dish 36 has been provided with correspondingly arranged projections matching the recesses, with the projections, in the coupled condition, being movable in the respective apertures or recesses of the profiled tube 34. Such profiles are known in themselves and in use.

The implement 4 has been provided with a holding device 40, for instance in the form of a U-bracket for approximately aligning and holding the second driveshaft portion 28. This holding device 40 ensures that when the implement 4 is in the deposited position, the second driveshaft portion 28 does not rest on the ground but can still be lowered or raised within the range of movement of the first driveshaft portion 27. The second driveshaft portion 28 is also surrounded by an accident preventing device 30 which is engaged by the holding device 40.

To complement the possible and partially already described coupling processes, in case that only automatic coupling of the three-point coupling device is possible, there is a further extended coupling process as follows: With the help of the power lever, i.e. by actuating the lifting arms 9, 9a, the lifting bars 10, 10a and the lower hitch arms 5, 5a, the first dirveshaft portion 27 is aligned by simultaneously manoeuvring the tractor by moving back the introducing journal 39 of the second driveshaft portion 28 in the direction of the introducing sleeve 35 of the profiled tube. The process of alignment may be assisted by using a funnel or a conically expanding catching dish 36 which is associated with the accident preventing device 29 of the first driveshaft portion 27. This increases the catching range. By continuing the backward movement, it is possible to center the two profiled tubes of the two driveshaft portions 27, 28 relative to each other. Subsequently, the coupling process takes place as described in connection with the embodiments to FIGS. 1 to 5.

We claim:

1. A three-point coupling device for coupling a tractor to an implement, comprising two lower hitch arms which are articulated at the rear end of the tractor so as to be offset sideways with respect to the longitudinal axis of the tractor and whose free ends have each been provided with a catching hook having a lockable catching jaw which opens upwardly, with each lower hitch arm, via a lifting bar, being connected to a lifting arm movable by the power drive of the tractor; and comprising an upper hitch arm whose one end is articulated at the rear end of the tractor above the lower hitch arms in the region of the longitudinal axis and whose other end has been provided with a catching hook comprising a lockable catching jaw which opens downwardly or upwardly, with the catching hooks, for coupling purposes, being suitable for engaging, or being released from, the corresponding coupling points of the implement to be coupled, wherein the upper hitch arm is resiliently held by tensioned springs to move upwards or downwards relative to the tractor with the lower hitch arms, with the upper hitch arm moving in a direction opposite to the lower hitch arms, the upper hitch arm being held by providing two intermediate tension springs, one end of each of which is connected to the upper hitch arm and the other end of each of which is connected to a pulling means, which is first guided by guide means fixed to the rear of the tractor and then attached to lifting arms or lifting bars of the lower hitch arms or to the lower hitch arms themselves.

2. A three-point coupling device according to claim 1, wherein the catching hooks are designed so as to lock automatically.

3. A three-point coupling device according to claim 1, also comprising a coupler for a driveshaft for passing on a rotary movement of a power take-off shaft of the tractor to an input shaft of the implement to be driven.

4. A three-point coupling device according to claim 3, wherein the driveshaft consists of a first portion comprising a joint and a profiled tube firmly attached to it as well as an accident preventing device which remains stationary relative to the tractor and which is connected to lifting bars or the lifting arms of the lower hitch arms by two holding springs; and of a second portion which comprises a joint and a profiled member which is firmly attached to it and which may be inserted into the profiled tube, and also including an accident preventing device on said second portion.

5. A three-point coupling device according to claim 4, wherein the profiled member is provided with a conical introducing journal and the profiled tube with an introducing sleeve.

6. A three-point coupling device according to claim 1, wherein at the upper hitch arm and/or in the region of the upper coupling point of the implement, means are provided for aligning the catching hook of the upper hitch arm and the upper coupling point with respect to one another.

7. A three-point coupling device for coupling a tractor to an implement, comprising two lower hitch arms which are articulated at the rear end of the tractor so as to be offset sideways with respect to the longitudinal axis of the tractor and whose free ends have each been provided with a catching hook having a lockable catching jaw which opens upwardly, with each lower hitch arm, via a lifting bar, being connected to a lifting arm movable by the power drive of the tractor; and comprising an upper hitch arm whose one end is articulated at the rear end of the tractor above the lower hitch arms in the region of the longitudinal axis and whose other end has been provided with a catching hook comprising a lockable catching jaw with opens downwardly or upwardly, with the catching hooks, for coupling purposes, being suitable for engaging, or being released from, corresponding coupling points of the implement to be coupled, wherein the upper hitch arm is resiliently held by tension springs to move upwards or downwards relative to the tractor with the lower hitch arms with the upper hitch arm moving in the same direction as the lower hitch arms, the upper hitch arm being aligned and held by provided two intermediate tension springs, one end of each of which is connected to the upper hitch arm and the other end of each of which is connected to one of said lifting arms or lifting bars of the lower hitch arm.

8. A three-point coupling device according to claim 7, wherein the catching hooks are designed so as to lock automatically.

9. A three-point coupling device according to claim 7, also comprising a coupler for a driveshaft for passing on a rotary movement of a power take-off shaft of the tractor to an input shaft of the implement to be driven.

10. A three-point coupling device according to claim 9, wherein the driveshaft consists of a first portion comprising a joint and a profiled tube firmly attached to it as well as an accident preventing device which remains stationary relative to the tractor and which is connected to lifting bars or the lifting arms of the lower hitch arms by two holding springs; and of a second portion which comprises a joint and a profiled member which is firmly attached to it and which may be inserted into the profiled tube, and also including an accident preventing device on said second portion.

11. A three-point coupling device according to claim 10, wherein the profile member is provided with a conical introducing journal and the profiled tube with an introducing sleeve.

12. A three-point coupling device according to claim 7, wherein at the upper hitch arm and/or in the region of the upper coupling point of the implement, means are provided for aligning the catching hook of the upper hitch arm and the upper coupling point with respect to one another.

* * * * *